US011959318B2

(12) United States Patent
Huang et al.

(10) Patent No.: US 11,959,318 B2
(45) Date of Patent: Apr. 16, 2024

(54) OVEN

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW)

(73) Assignee: GRAND MATE CO., LTD., Taichung (TW)

(*) Notice: Subject to any disclaimer, the term of this patent is extended or adjusted under 35 U.S.C. 154(b) by 174 days.

(21) Appl. No.: 17/327,090

(22) Filed: May 21, 2021

(65) Prior Publication Data

US 2022/0372803 A1 Nov. 24, 2022

(51) Int. Cl.

*E05C 17/00* (2006.01)
*F24C 15/02* (2006.01)
*F24C 15/12* (2006.01)

(52) U.S. Cl.

CPC ............ *E05C 17/025* (2013.01); *F24C 15/02* (2013.01); *F24C 15/021* (2013.01); (Continued)

(58) Field of Classification Search

CPC ...... F24C 15/02; F24C 15/021; F24C 15/026; F24C 15/028; F24C 15/023; F24C 15/34
(Continued)

(56) References Cited

U.S. PATENT DOCUMENTS 110,747 A * 1/1871 Deane
392,485 A 11/1888 Andrews
(Continued)

FOREIGN PATENT DOCUMENTS

CN 1458459 A 11/2003
CN 1895060 A 1/2007
(Continued)

OTHER PUBLICATIONS

Whereoware. "TOB-135N." Cuisinart, 2018, https://www.cuisinart.com/shopping/appliances/toaster_ovens/tob-135n/. (Year: 2018).*
(Continued)

*Primary Examiner* — Allen R. B. Schult
*Assistant Examiner* — William C Weinert
(74) *Attorney, Agent, or Firm* — Apex Juris pllc; Hilde Coeckx

(57) ABSTRACT

An oven includes an oven body, a heating element, a frame, and an oven door. The oven body has an inner space inside and includes a front plate, wherein the front plate has an entrance that communicates with the inner space. The heating element is adapted to heat the inner space. The frame is engaged with the oven body and has an abutted portion. The oven door is pivotally connected to the oven body and is located at the entrance. The oven door can pivot to a closed position to close the entrance and can pivot downward to an open position from the closed position to open the entrance. When the oven door is located at the open position, the second surface abuts against the abutted portion of the frame, thereby forming a platform outside the entrance for placing objects.

8 Claims, 12 Drawing Sheets

(52) U.S. Cl.
CPC .......... *F24C 15/026* (2013.01); *F24C 15/028* (2013.01); *F24C 15/023* (2013.01)

(58) Field of Classification Search
USPC .......................................................... 126/191
See application file for complete search history.

(56) References Cited

U.S. PATENT DOCUMENTS

| | | | | | |
|---|---|---|---|---|---|
| 1,455,732 | A | * | 5/1923 | Nicolaus | F24C 15/023 16/374 |
| 1,574,941 | A | | 3/1926 | Sexton | |
| 3,782,360 | A | * | 1/1974 | Brucken | F24C 15/02 126/273 R |
| 6,257,128 | B1 | | 7/2001 | Chen | |
| 9,157,641 | B1 | | 10/2015 | Draper | |
| 2006/0086151 | A1 | * | 4/2006 | Kim | D06F 39/14 68/24 |
| 2008/0121632 | A1 | * | 5/2008 | Wang | F24C 7/06 219/393 |
| 2014/0007860 | A1 | | 1/2014 | Lu | |
| 2015/0060432 | A1 | | 3/2015 | Chung et al. | |
| 2018/0363918 | A1 | * | 12/2018 | Buchmann | F24C 15/023 |
| 2019/0257526 | A1 | * | 8/2019 | Streitwieser | F24C 15/02 |

FOREIGN PATENT DOCUMENTS

| | | | | | |
|---|---|---|---|---|---|
| CN | 209220009 | U | | 8/2019 | |
| CN | 110574490 | A | | 12/2019 | |
| CN | 209899169 | U | | 1/2020 | |
| DE | 7519943 | U | | 11/1975 | |
| DE | 202018100021 | U1 | | 1/2018 | |
| EP | 3644746 | A1 | | 5/2020 | |
| ES | 2014689 | A6 | | 7/1990 | |
| JP | H6-104084 | A | | 4/1994 | |
| JP | 2001186991 | A | | 7/2001 | |
| KR | 20090064611 | A | | 6/2009 | |
| TW | 200834016 | A | | 8/2008 | |
| TW | M468275 | U | | 12/2013 | |
| WO | WO-2019000019 | A1 | * | 1/2019 | A21B 1/22 |

OTHER PUBLICATIONS

Search Report for TW110112599, dated Nov. 29, 2022, Total of 1 page.
Search Report for EP22166342.0, dated Aug. 11, 2022, Total of 8 pages.
Translation of Abstract of CN1458459, Total of 1 page.
Translation of Abstract of CN110574490, Total of 1 page.
Translation of Abstract of CN209220009, Total of 1 page.
Translation of Abstract of JPH6-104084, Total of 1 page.
Translation of Abstract of TW200834016, Total of 1 page.
Translation of Abstract of DE202018100021, Total of 1 page.
Search Report for CN2021103868961, dated Dec. 28, 2022, Total of 3 pages.
Translation of Abstract of CN1895060, Total of 1 page.
Translation of Abstract of JP2001186991, Total of 1 page.
Translation of Abstract of TWM468275, Total of 1 page.
Translation of Abstract of ES2014689, Total of 1 page.
Translation of Abstract of KR20090064611, Total of 1 page.
Translation of Abstract of CN209899169, Total of 1 page.

* cited by examiner

OVEN

BACKGROUND OF THE INVENTION

Technical Field

The present invention relates generally to a heating apparatus, and more particularly to an oven.

Description of Related Art

The conventional oven includes an oven body, a heating element, and an oven door. The oven body has an inner space for place objects ready for being baked. The oven body has an entrance that communicates with the inner space. The objects could be put into or taken out through the entrance. The heating element is adapted to heat the inner space. The oven door is pivotally connected to the oven body and is adapted to close or open the entrance.

During a baking process, a user often has to add additional ingredients to the baked objects, such as spread jam. Since the conventional oven door is unable to carry the food, the user needs to pull out the food to the entrance and to reach hands into the inner space to add the additional ingredients. It should be noted that the hands of the user are easy to be burned during the aforementioned process when the user is not careful to touch an inner wall of the inner space.

Therefore, the conventional oven has room for improvement.

BRIEF SUMMARY OF THE INVENTION

In view of the above, the primary objective of the present invention is to provide an oven, wherein an oven door of the oven could form a platform for putting stuff when the oven door is opened.

The present invention provides an oven, including an oven body, a heating element, a frame, and an oven door, wherein the oven body has an inner space inside. The oven body includes a front plate, wherein the front plate has an entrance that communicates with the inner space. The heating element is disposed in the oven body and is adapted to heat the inner space. The frame is engaged with the oven body and has an abutted portion, wherein the abutted portion is located outside the entrance. The oven door is pivotally connected to the oven body and is located at the entrance. The oven door has a first surface and a second surface that face opposite directions. When the oven door pivots to a closed position, the entrance is closed. When the oven door pivots down to an open position from the closed position, the entrance is opened. When the oven door is located at the closed position, the first surface of the oven door faces the inner space. When the oven door is located at the open position, the second surface of the oven door is abutted against the abutted portion of the frame.

With such design, when the oven door is located at the open position, a platform could be formed at the outside of the entrance. Since the abutted portion of the frame abuts the second surface of the oven door, the bearing ability of the oven door could be increased, thereby allowing the user to put the baked object on the first surface of the oven door.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As illustrated in FIG. 1 to FIG. 12, an oven of an embodiment of the present invention includes an oven body 10, a heating element 22, a frame 24, and an oven door 32.

Figure 7:
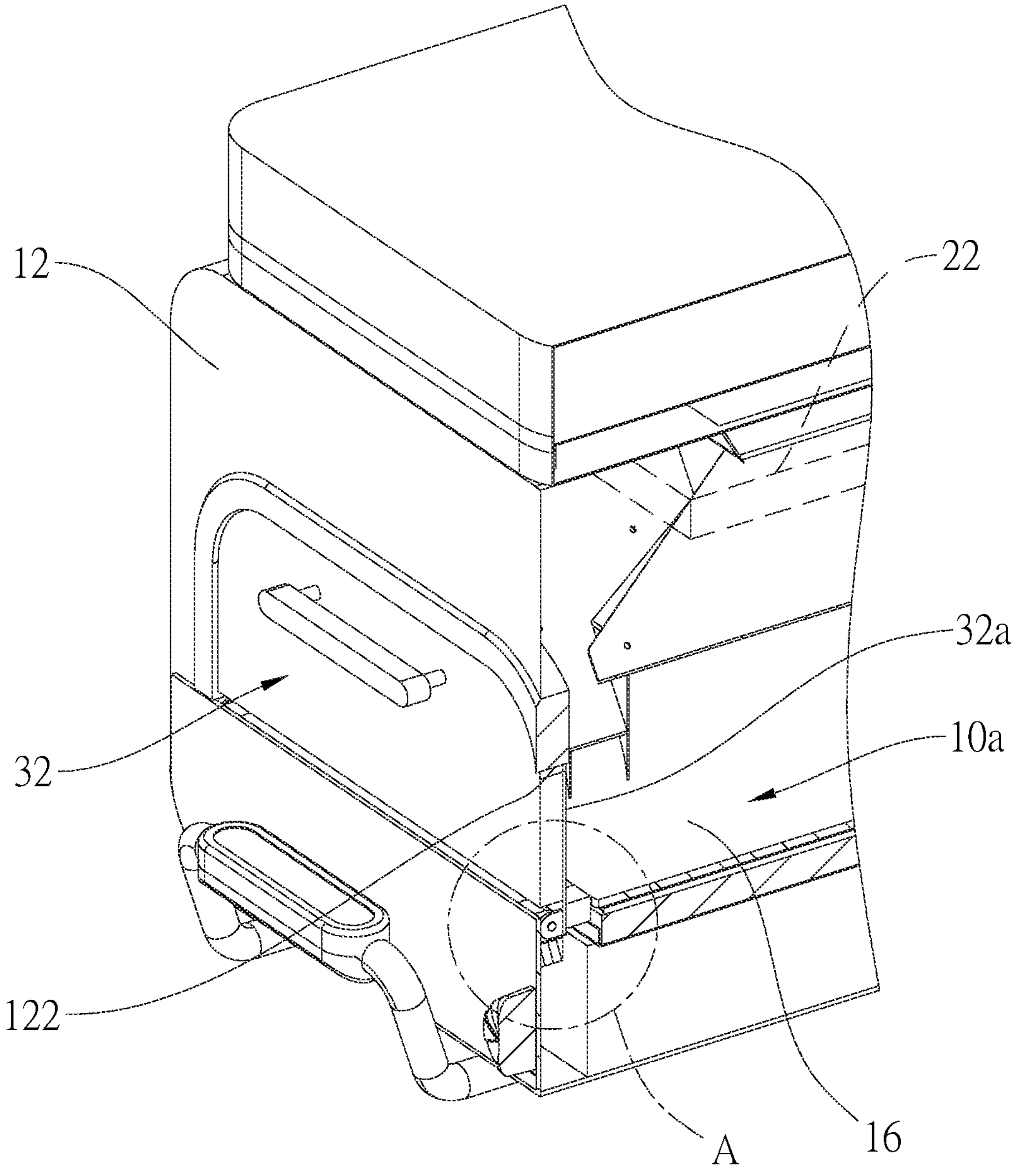
FIG. 7 is a perspective view of the oven of the embodiment according to the present invention, showing a partial section.
Figure 8:
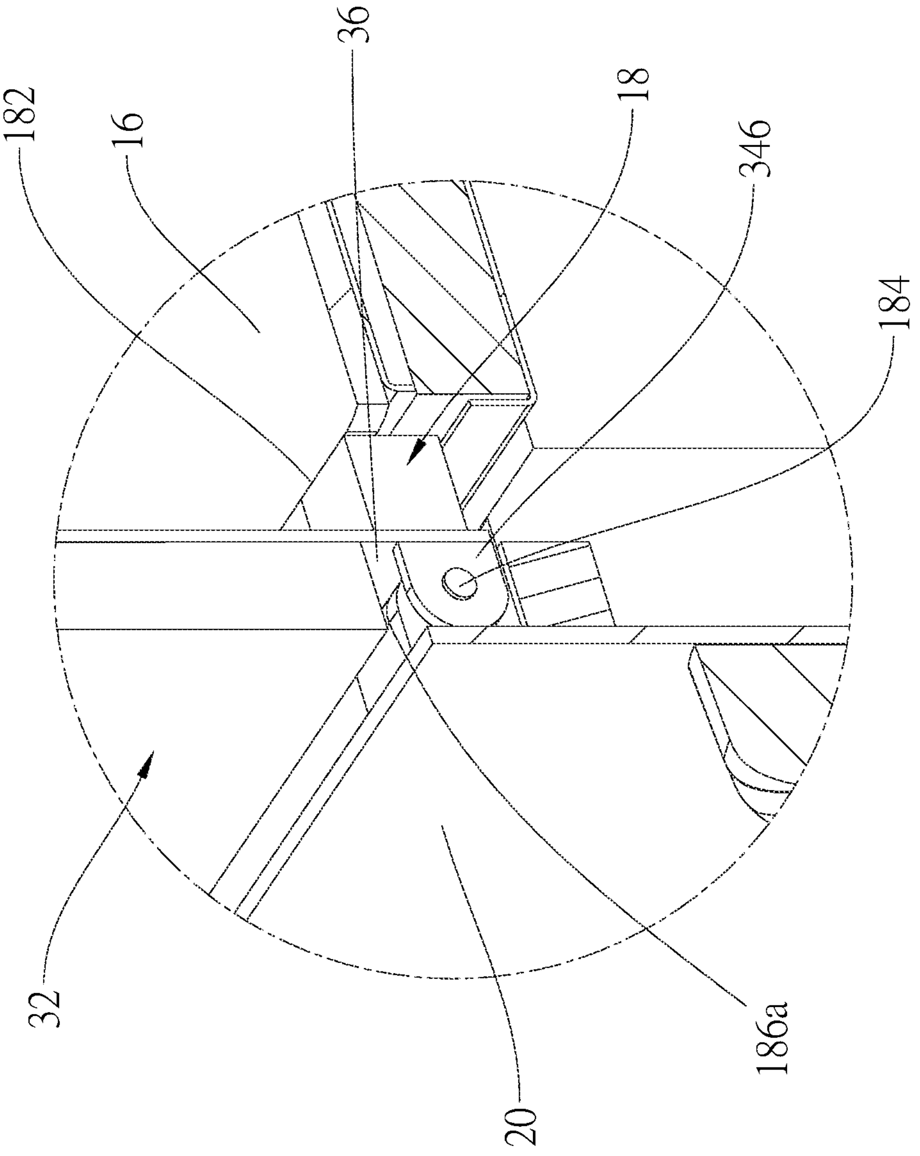
FIG. 8 is an enlarged partial view of a marked region A in FIG. 7.
Figure 9:
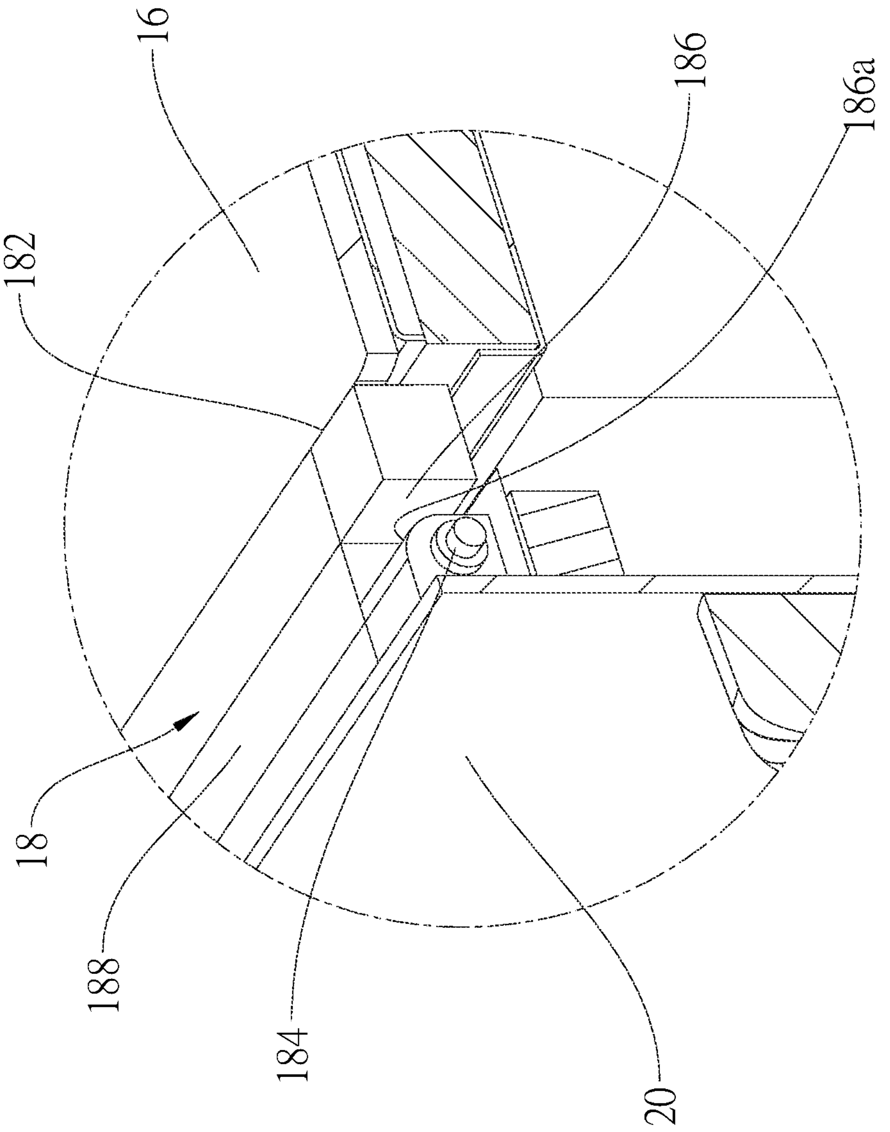
FIG. 9 is an enlarged partial view of a marked region A in FIG. 7, wherein the oven door is omitted.
Figure 10:
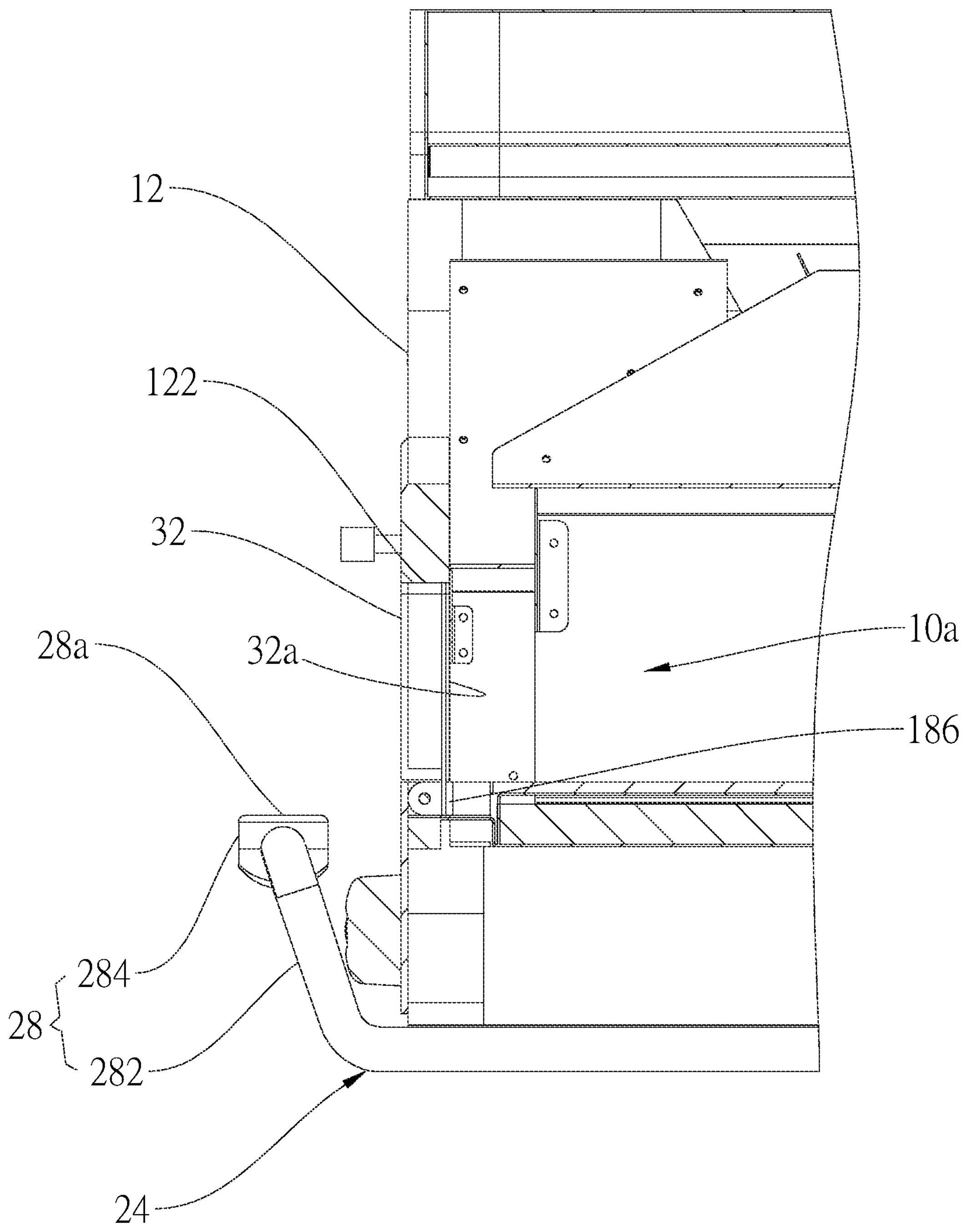
FIG. 10 is a side view of the oven shown in FIG. 7.

The oven body 10 includes a front plate 12 and a rear plate 14, which are opposite to each other, wherein the oven body 10 has an inner space **10*a* that could be heated. The front plate 12 has an entrance 122 which communicates with the inner space 10*a*. As illustrated in FIG. 7 to FIG. 9, a carrier plate 16 is disposed in the oven body 10 and is located at a bottom portion of the inner space 10*a*, wherein the carrier plate 16 is adapted to carry objects for being baked, such as food. The oven body 10 further includes a bridge plate 18 which is located at a bottom portion of the entrance 122 and has an inner side 182. The inner side 182 of the bridge plate 18 is adjacent to the carrier plate 16. Preferably, the inner side 182 is abutted against the carrier plate 16. The bridge plate 18 has two pivotally connecting portions 184 which are located at two opposite sides of the bridge plate 18. A groove 186 is located between each of the pivotally connecting portion 184 and the carrier plate 16. A portion between the two grooves 186 of the bridge plate 18 forms a bridging portion 188, wherein the bridging portion 188 extends away from the carrier plate 16. Each of the grooves 186 has a wall 186*a* that is curved and faces toward the inner space 10*a*. The oven body 10 further includes a shield 20 which is located at an outer side of the bridge plate 18, wherein the outer side of the bridge plate 18 and a side of the bridge plate 18 facing the oven body 10, wherein the outer side and the side of the bridge plate 18** face opposite directions.

As illustrated in FIG. 7, the heating element 22 is disposed in the oven body 10 and heats the inner space **10*a*. In the current embodiment, the heating element 22** could be, but not limited to, a gas burner.

The frame 24 is engaged with the oven body 10. In the current embodiment, the frame 24 includes two supporting sections 26, a first holding section 28, and a second holding section 30, wherein the two supporting sections 26 are two straight tubes which are connected to the bottom portion of the oven body 10 and are parallel to each other. Each of the supporting sections 26 extends in a direction from the front plate 12 to the rear plate 14. The first holding section 28 is located outside the entrance 122 and is below the entrance 122. The first holding section 28 is connected to an end of each of the two supporting sections 26 and has an abutted portion 28*a*, wherein the abutted portion 28*a* is located lower than a bottom edge of the entrance 122. The second holding section 30 is located outside the rear plate 14 and is connected to another end of each of the two supporting sections 26. The first holding section 28 and the second holding section 30 are respectively located at a front side and a rear side of the oven body 10 and are symmetrical.

More particular, the first holding section 28 includes a first extending tube 282 and a grip (which is defined as a first grip 284). Two ends of the first extending tube 282 are respectively connected to front ends of the two supporting sections 26, and the first extending tube 282 extends upward. The first grip 284 fits around a top portion of the first extending tube 282. A surface of the first grip 284 constitutes the abutted portion 28*a*. The second holding section 30 includes a second extending tube 302 and a grip (which is defined as a second grip 304). Two ends of the second extending tube 302 are respectively connected to rear ends of the two supporting sections 26, and the second extending tube 302 extends upward. The second grip 304 fits around a top portion of the second extending tube 302. A user could hold the first holding section 28 and the second holding section 30 with two hands to lift up the oven. Since the two supporting sections 26 evenly support the bottom portion of the oven body 10, the oven body 10 could be stably lifted up.

Figure 1:
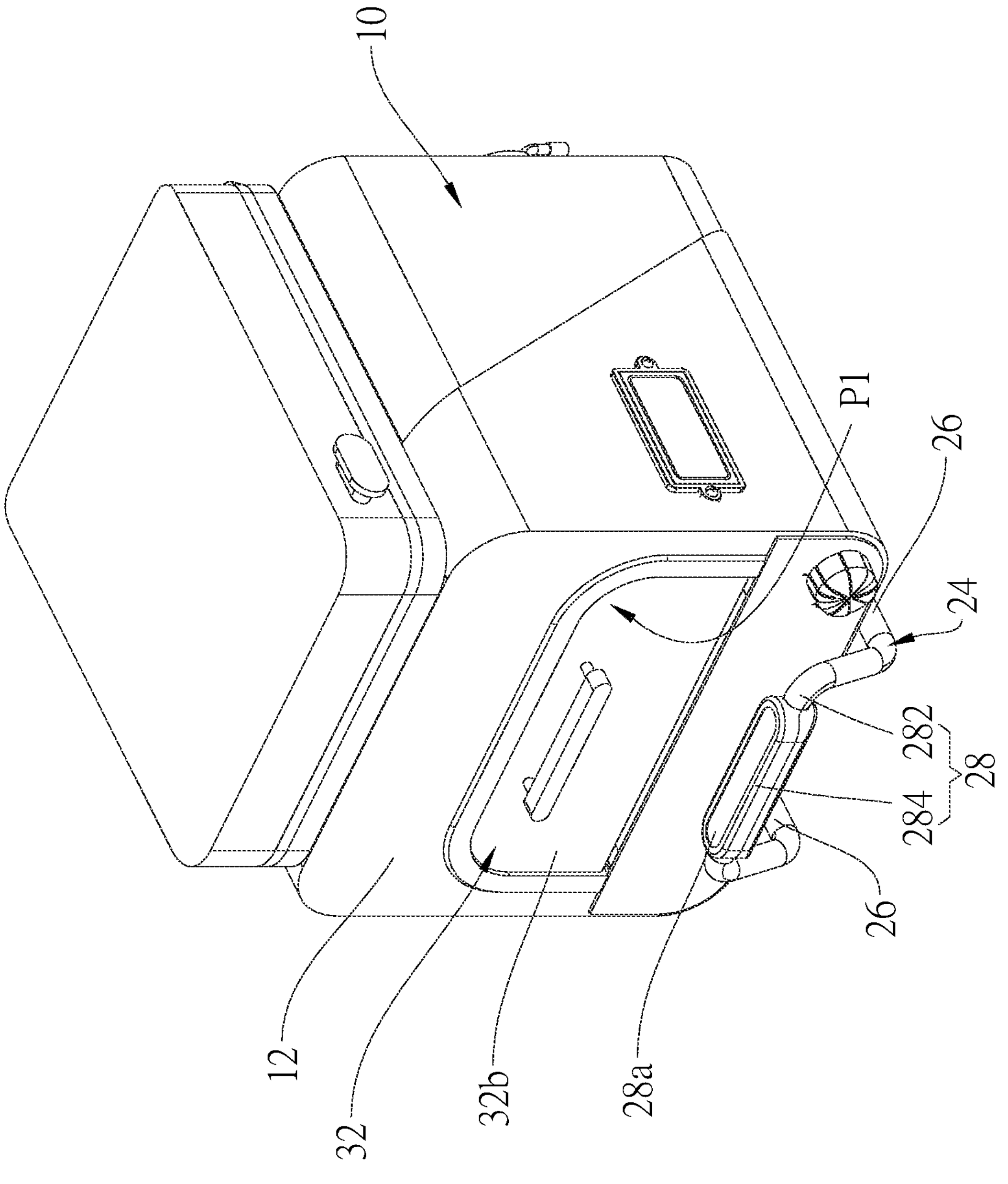
FIG. 1 is a perspective view of the oven of an embodiment according to the present invention.
Figure 2:
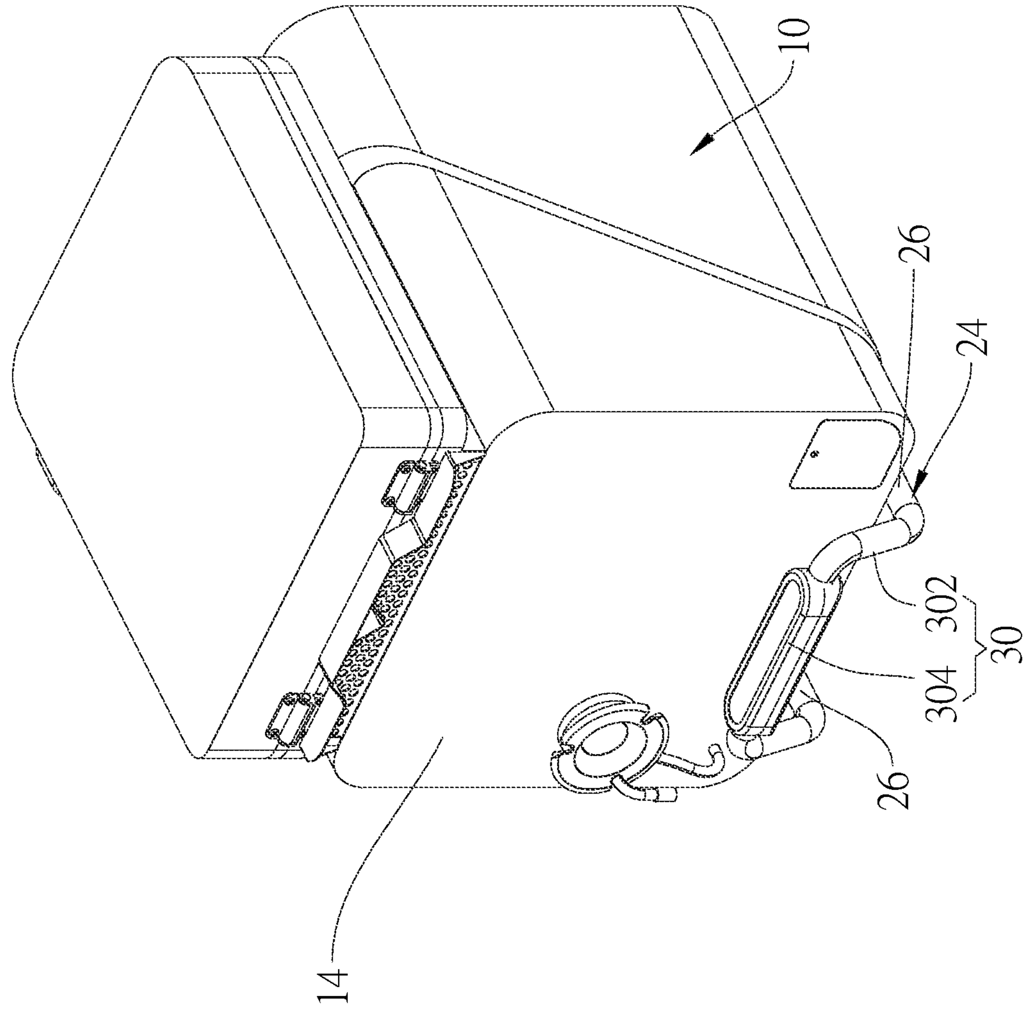
FIG. 2 is a perspective view of the oven of the embodiment according to the present invention seen from another perspective.
Figure 3:
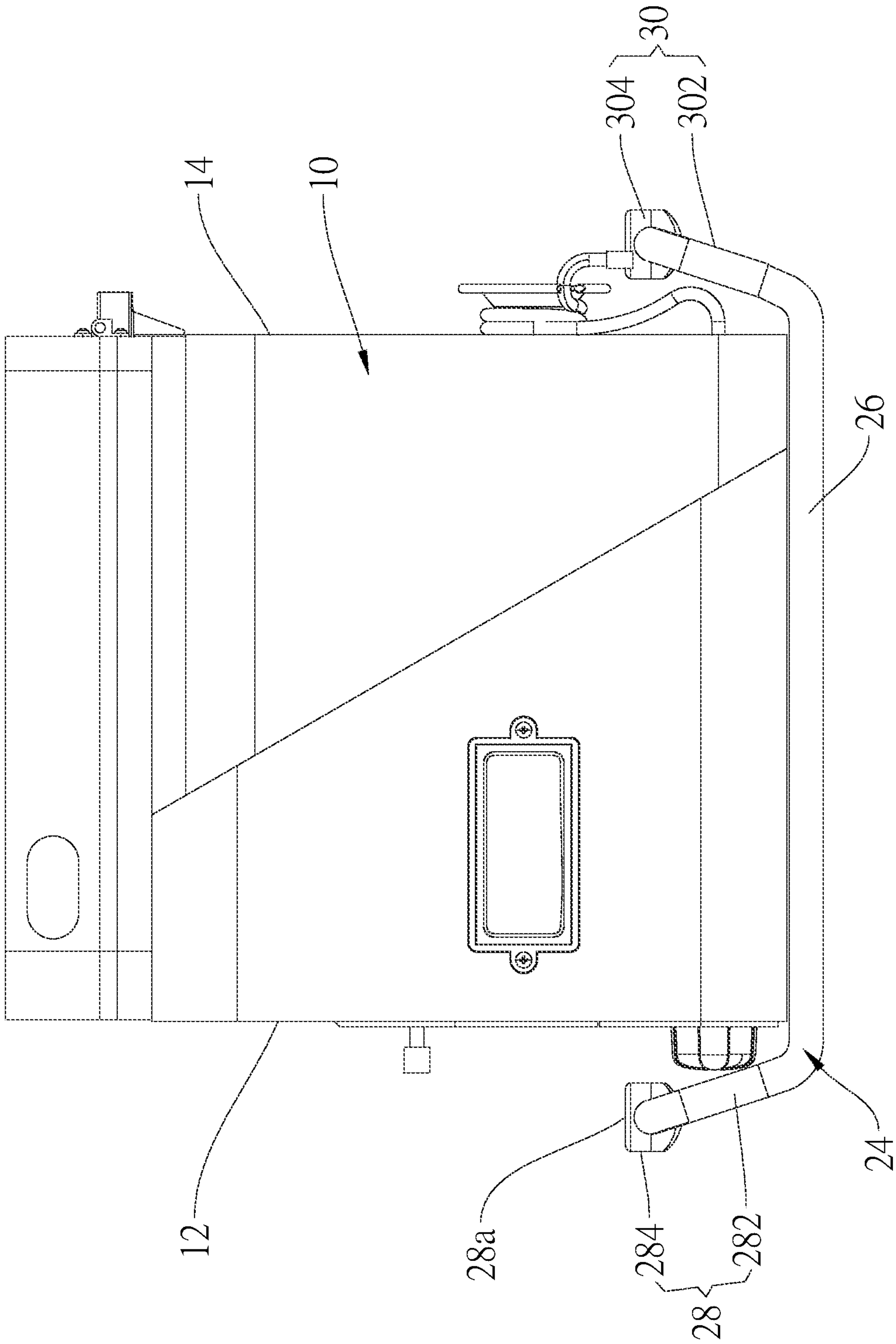
FIG. 3 is a side view of the oven of the embodiment according to the present invention.
Figure 4:
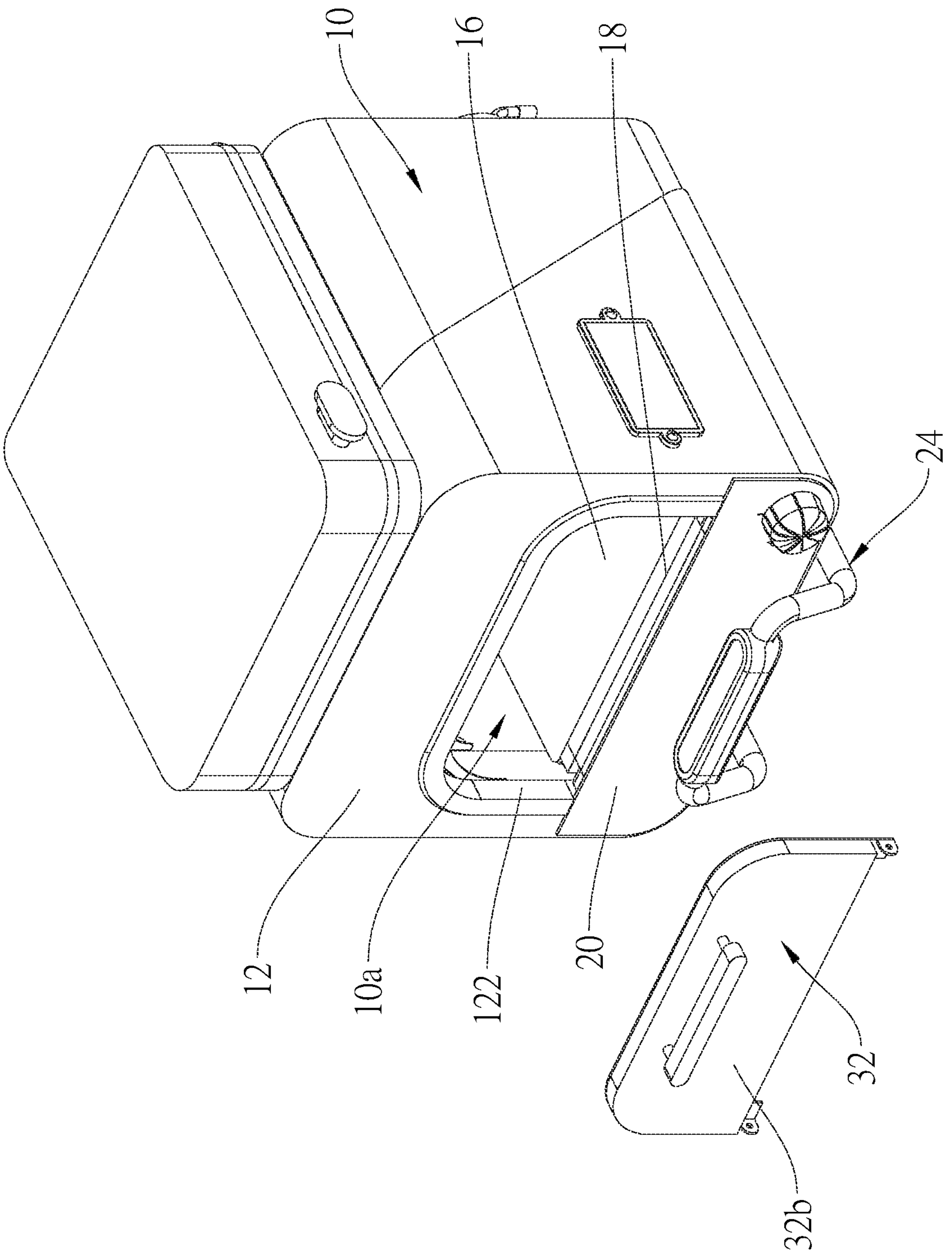
FIG. 4 is a partially exploded view of the oven of an embodiment according to the present invention.
Figure 5:
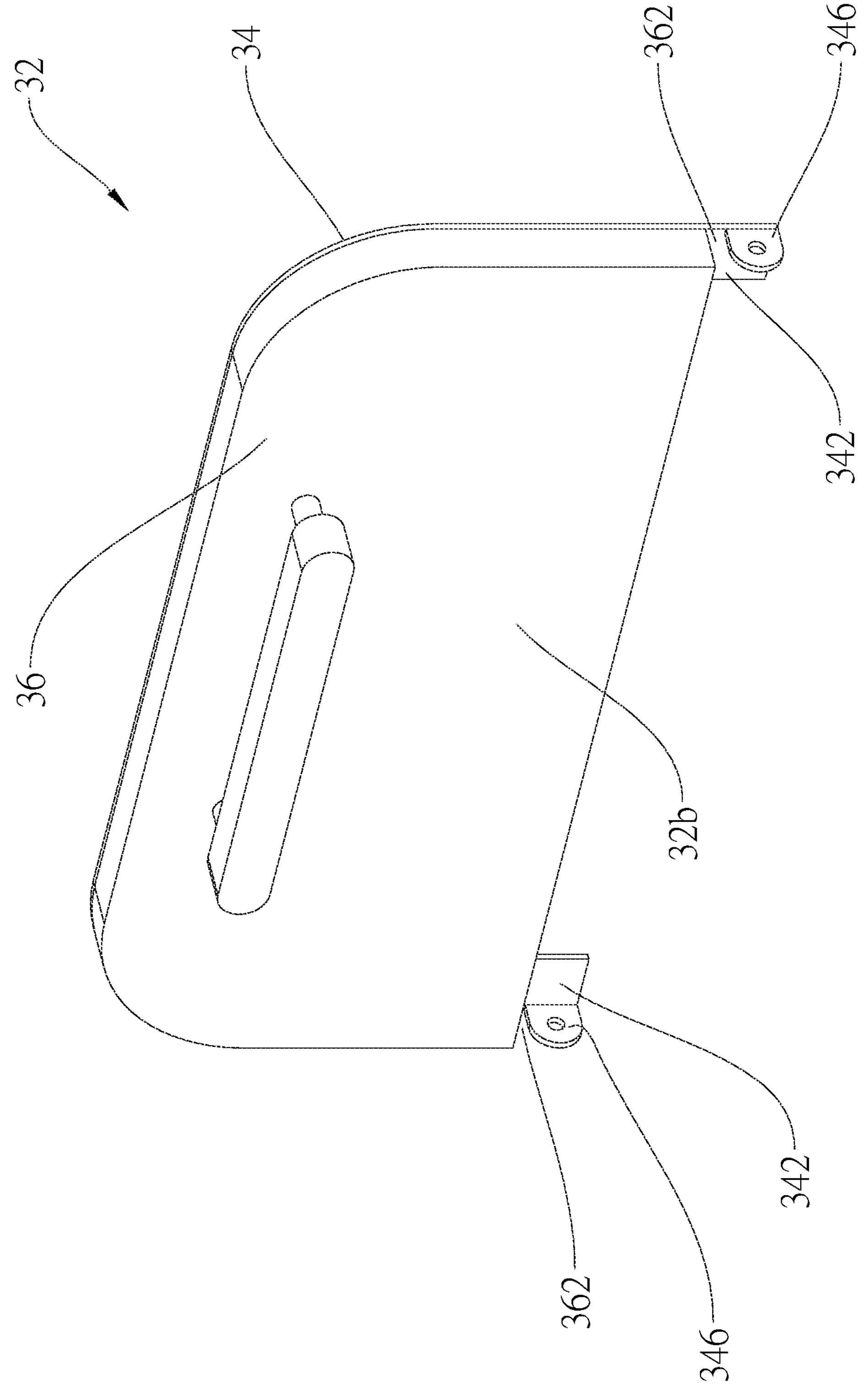
FIG. 5 is a perspective view of the oven door of the embodiment according to the present invention.
Figure 6:
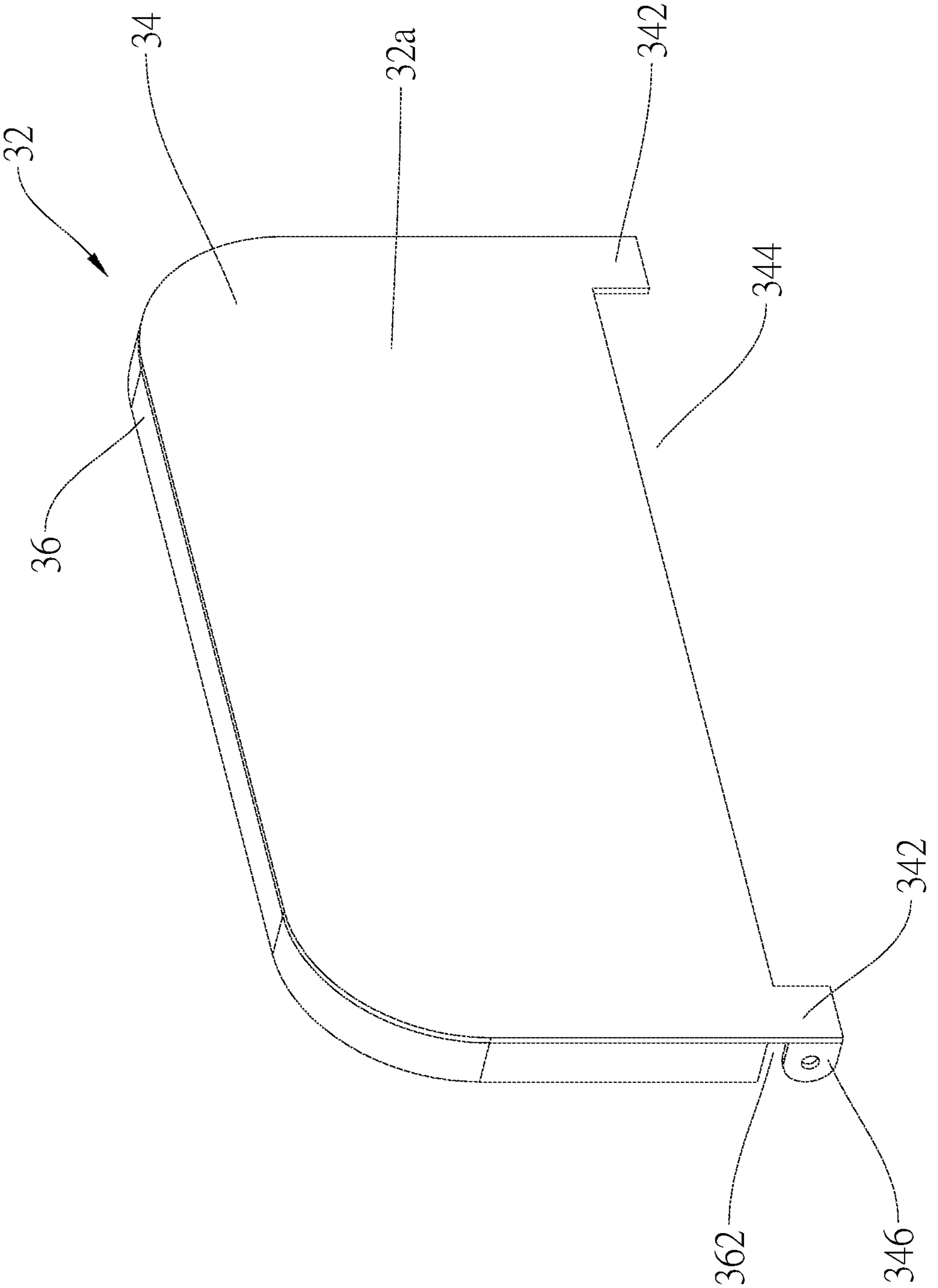
FIG. 6 is a perspective view of the oven door of the embodiment according to the present invention seen from another perspective.
Figure 11:
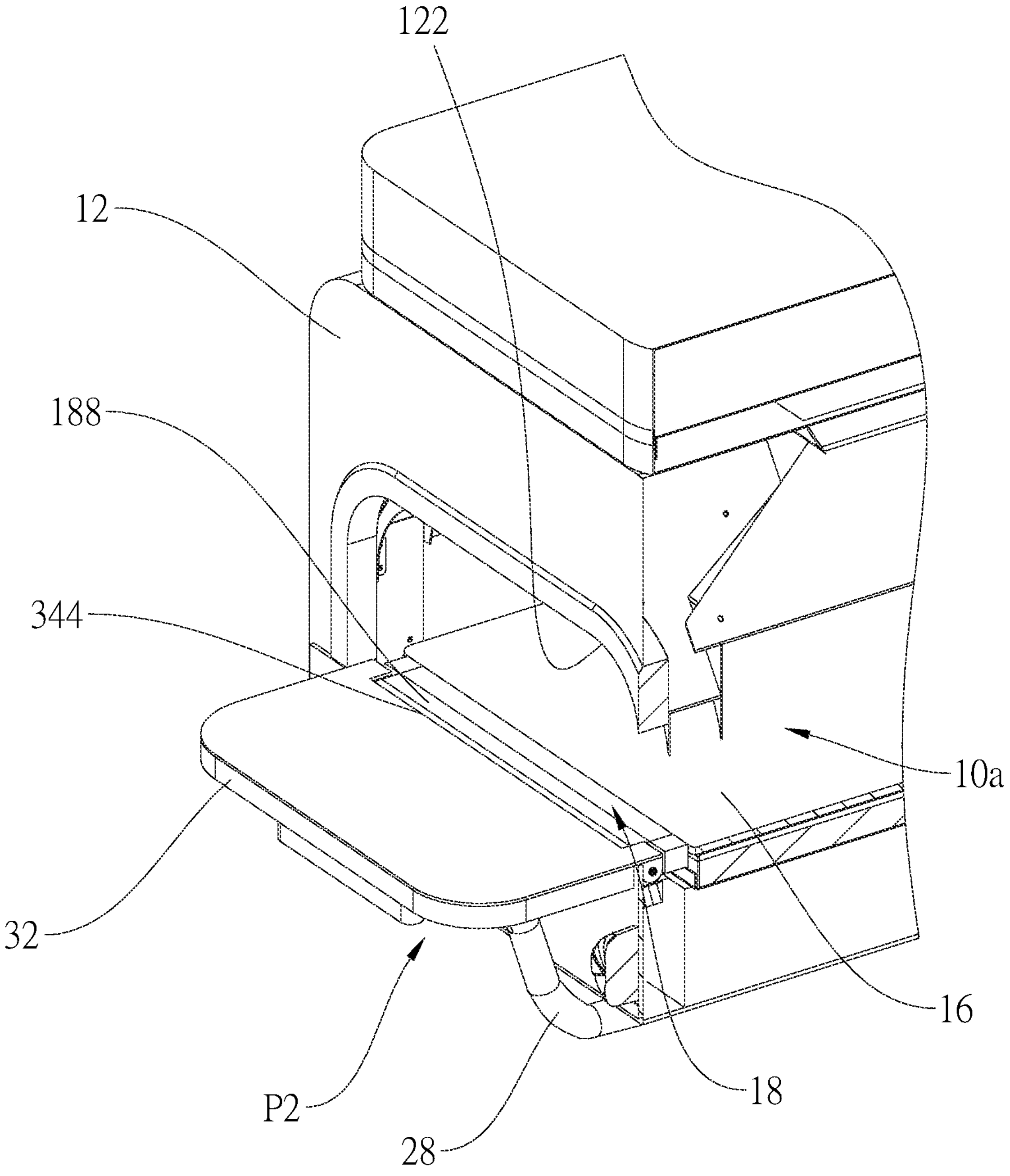
FIG. 11 is similar to FIG. 7, showing the oven door is opened.

The oven door 32 is pivotally connected to the oven body 10 and is located at the entrance 122. As illustrated in FIG. 5 and FIG. 6, the oven door 32 has a first surface 32*a* and a second surface 32*b* which face opposite directions. The oven door 32 can pivot between a closed position P1 (as shown in FIG. 1) and an open position P2 (as shown in FIG. 11). When the oven door 32 pivots to the closed position P1, the entrance 122 is closed, wherein the first surface 32*a* of the oven door 32 faces the inner space 10*a*. When the oven door 32 pivots downward at a predetermined angle to move from the closed position P1 to the open position P2, the entrance 122 is opened to allow the second surface 32*b* of the oven door 32 to abut against the abutted portion 28*a* of the frame 24. In the current embodiment, the predetermined angle is approximately 90 degrees.

In particular, as illustrated in FIG. 5 to FIG. 10, the oven door 32 includes a door plate 34, wherein the door plate 34 has the first surface 32*a*. A bottom portion of the door plate 34 has two extending portions 342, and a recess 344 is formed between the two extending portions 342. Each of two sides of the bottom portion of the door plate 34 has a pivot ear 346, wherein the two pivot ears 346 face each other. The two pivot ears 346 are respectively connected to the two extending portions 342. The two pivot ears 346 are pivotally connected to the two pivotally connecting portions 184 of the bridge plate 18 of the oven body 10. When the oven door 32 pivots to the closed position P1, the two extending portions 342 are respectively inserted into the two grooves 186 along the curved walls 186*a* of the two grooves 186, and the recess 344 fits around the bridging portion 188 of the bridge plate 18. While the oven door 32 is pivoting to the open position P2, the two extending portions 342 are moved out of the two grooves 186 along the curved wall 186*a* of the two grooves 186. When the oven door 32 is located at the open position P2, the recess 344 is located right above the bridging portion 188.

Figure 12:
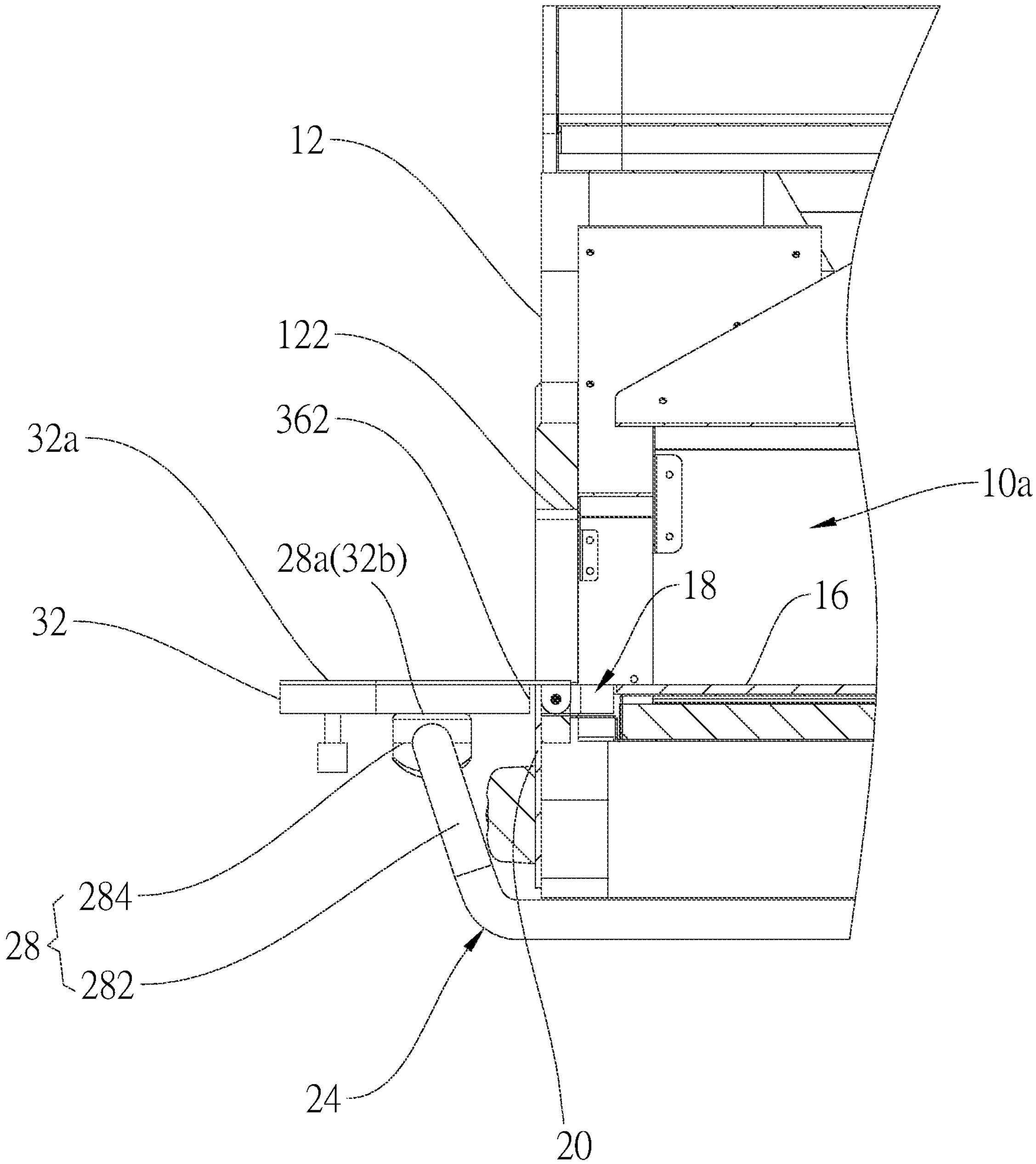
FIG. 12 is a side view of the oven shown in FIG. 11.

In the current embodiment, the oven door 32 further includes a thermal insulation plate 36 to increase a thermal insulation ability of the oven door 32, wherein the thermal insulation plate 36 has insulation material inside. The thermal insulation plate 36 is engaged with a side of the door plate 34 which is opposite to the first surface 32*a*. An outer surface of the thermal insulation plate 36 forms the second surface 32*b*. A slot is formed between each of the pivot ears 346 and a bottom edge of the thermal insulation plate 36. As illustrated in FIG. 11 and FIG. 12, when the oven door 32 pivots to the open position P2, a top edge of the shield 20 is inserted into the two slots 362. The recess 344 of the door plate 34 is located right above the top edge of the shield 20

With such design, when the oven door 32 is located at the open position P2, the oven door 32 could form a platform located outside the entrance 122, wherein the platform could be used for placing objects (for example a baked object) temporarily. Since the second surface 32*b* of the oven door 32 is abutted by the abutted portion 28*a* of the frame 24 to increase a bearing capacity of the oven door 32, the user could rest assured that the baked objected could be firmly placed on the first surface 32*a* of the oven door 32, thereby avoiding the user to be scalded by inner walls of the oven body 10. The bridge plate 18 under the recess 344 could be a connecting bridge between the bottom portion of the entrance 122 and the carrier plate 16, so that a gap is not formed between the bottom portion of the entrance 122 and the carrier plate 16. When the baked object is moved into the inner space 10*a*, the baked object could be moved from the first surface 32*a* of the oven door 32 could be moved to the carrier plate 16 from the first surface 32*a* of the oven door 32 through the bridge plate 18. On contrary, when the baked object is moved out, the baked object could be moved from the carrier plate 16 to the first surface 32*a* of the oven door 32 through the bridge plate 18. Therefore, it is beneficial to move the baked object between the first surface 32*a* of the oven door 32 and the carrier plate 16.

Additionally, since the thermal insulation plate 36 abuts against the abutted portion 28*a*, thermal energy of the oven door 32 is hard to transfer to the first grip 284 of the first holding section 28. Therefore, even if the user holds the first grip 284 right after the oven door 32 is turned back to the closed position P1, the hands of the user are not scalded.

It must be pointed out that the embodiment described above is only a preferred embodiment of the present invention. All equivalent structures which employ the concepts disclosed in this specification and the appended claims should fall within the scope of the present invention.

What is claimed is:

1. An oven, comprising:

an oven body having an inner space inside and comprising a front plate, wherein the front plate has an entrance that communicates with the inner space;

a heating element disposed in the oven body and adapted to heat the inner space;

a frame engaged with the oven body and having an abutted portion, wherein the abutted portion is located outside the entrance;

an oven door pivotally connected to the oven body and located at the entrance, wherein the oven door has a first surface and a second surface which face opposite directions; when the oven door pivots to a closed position, the entrance is closed; when the oven door pivots down to an open position from the closed position, the entrance is opened; when the oven door is located at the closed position, the first surface of the oven door faces the inner space; when the oven door is located at the open position, the second surface of the oven door is abutted against by the abutted portion of the frame;

wherein the abutted portion is located lower than the entrance and does not move along with the oven door; when the oven door is in the closed position, the abutted portion remains lower than the entrance, and the second surface of the oven door is away from the abutted portion;

wherein the frame has a first portion extending laterally and a second portion extending upwardly from the first portion, wherein the abutted portion is at a distal end of the second portion.

2. The oven as claimed in claim 1, wherein the oven door comprises a door plate, the door plate has the first surface and two pivot ears; the two pivot ears are pivotally connected to the oven body.

3. The oven as claimed in claim 2, wherein the oven body is disposed with a carrier plate; the carrier plate is located at a bottom portion of the inner space; the oven body comprises a bridge plate which is located at a bottom portion of the entrance; the bridge plate has an inner side which is adjacent to the carrier plate and has two pivotally connecting portions located at two opposite sides of the bridge plate; a groove is located between each of the two pivotally connecting portions and the carrier plate; a bridging portion is formed between the two grooves of the bridge plate; the door plate has two extending portions, and a recess is formed between the two extending portions; the two pivot ears respectively connected to the two extending portions; the two pivot ears are pivotally connected to the two pivotally connecting portions of the bridge plate of the oven body; when the oven door pivots to the closed position, the two extending portions are respectively entered into the two grooves, and the recess fits around the bridging portion of the bridge plate; when the oven door pivots to the open position, the two extending portions leaves the two grooves, and the recess is located right above the bridging portion.

4. The oven as claimed in claim 3, wherein the oven door comprises a thermal insulation plate; the thermal insulation plate is engaged with a side of the door plate which is opposite to the first surface and has the second surface and the bottom edge; a slot is formed between each of the two pivot ears and the bottom edge of the thermal insulation plate; the shield is located at an outer side of the bridge plate; when the oven door pivots to the open position, a top edge of the shield is inserted into the two slots.

5. The oven as claimed in claim 3, wherein each of the grooves has a wall that is curved, the curved walls face toward the inner space; when the oven door pivots, the extending portions are moved along the curved walls.

6. The oven as claimed in claim 1, wherein the oven body comprises a rear plate; the frame comprises two supporting sections, a first holding section, and a second holding section; each of the supporting sections is connected to a bottom portion of the oven body and extends from the front plate to the rear plate; the first holding section is connected to an end of each of the two supporting sections, and the second holding section is connected to another end of each of the two supporting sections, the first holding section has the abutted portion.

7. The oven as claimed in claim 6, wherein the first holding section comprises a grip, and a top surface of the grip forms the abutted portion.

8. The oven as claimed in claim 6, wherein the first holding section and the second holding section are respectively located at a front side and a rear side of the oven body and are symmetrical.

* * * * *